March 22, 1938. L. J. HOIS 2,111,777
COFFEE MAKER
Filed July 1, 1935
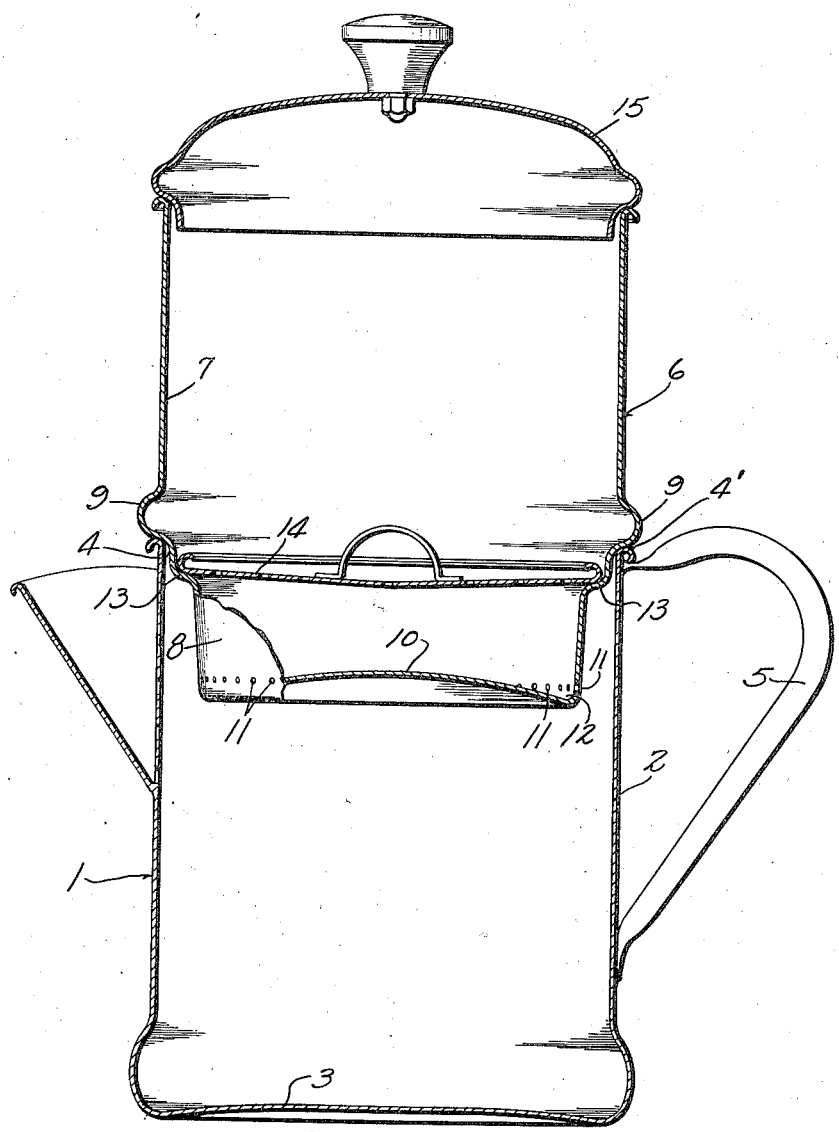
INVENTOR
Louis J. Hois
BY
Bottum, Hudnall, Locher,
McNamara, & Michael
ATTORNEYS Patented Mar. 22, 1938

2,111,777

UNITED STATES PATENT OFFICE 2,111,777

COFFEE MAKER

Louis John Hois, Milwaukee, Wis., assignor to Geuder, Paeschke & Frey Co., Milwaukee, Wis., a corporation of Wisconsin Application July 1, 1935, Serial No. 29,215

1 Claim. (Cl. 53—3)

This invention relates to an improvement in coffee makers of the coffee pot type.

One of the objects of the invention is to provide a coffee maker of this character which may be conveniently employed for quickly making the desired quantity of coffee of agreeable strength, flavor and aroma and yet is of such simple construction and so compactly organized that it may be readily manufactured with economy from materials and by means of facilities ordinarily available.

One of the principal features of the invention resides in the incorporation in the pot structure of an extremely simple and yet effective means for trapping the fine sediment or powder which is frequently washed out of the coffee grains when the same are infused with hot water and which accomplishes this result without any appreciable loss of coffee. The advantages of this arrangement are had and yet the making of a good quality of coffee is insured even where but a small quantity of coffee is to be made.

Other objects and advantages reside in certain novel features of the construction, arrangement and combination of parts which will be hereinafter more fully described and particularly pointed out in the appended claim, reference being had to the accompanying drawing, forming a part of this specification, and in which:

The figure is a view partly in side elevation and partly in transverse vertical section showing a coffee pot embodying the present invention.

Referring to the drawing, numeral 1 designates a lower receptacle having a cylindrical body portion or wall, an integral bottom wall 3 and an open upper end designated at 4. A suitable handle 5 may be provided on this lower receptacle.

An upper receptacle 6 is provided and has a cylindrical wall 7 which has its lower end portion reduced as at 8. In the assembly the reduced portion 8 fits down in the open upper end 4 of the lower receptacle and an annular shoulder 9, provided in the wall of the upper receptacle 6, rests against the rim 4' of the open upper end of the receptacle. The upper receptacle 6 is open at its top or upper end but its lower end is closed by an imperforate bottom wall 10. The reduced portion 8, just above the bottom 10, is provided with a circumferential series of closely spaced and rather small perforations or openings 11. Since these perforations are located slightly above the imperforate bottom 10 there is defined in the lower end portion of the upper receptacle a trap 12 in which sediment or fine powder washed out of the coffee grains, settles and is confined.

Another feature of advantage resides in having the bottom 10 of the upper receptacle upwardly dished. This insures presence of the coffee in the region of the openings 11 so that the hot water poured into the upper receptacle must travel through the grains before it may pass out through the openings 11.

The upper receptacle 6 also has an internal shoulder-like support 13 extending circumferentially thereabout and providing a support for a removable and perforated spreader plate 14. A suitable cover or lid 15 may be provided for the upper receptacle.

In using the device the receptacle 6 is placed on the lower receptacle 1, as illustrated in the drawing. The cover 15 and spreader 14 are removed and a suitable quantity of coffee is placed in the lower reduced end 8 of the upper receptacle. The spreader plate 14 is then put into position and a suitable quantity of hot water is poured into the upper receptacle. The hot water is diffused or spread out by the plate 14 and thoroughly saturates and soaks the coffee grains before the resulting solution travels out through the openings 11 into the lower receptacle. Any sediment or fine powder is trapped into the chamber 12 and this improves the quality of the coffee made.

While I have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claim.

The invention claimed is:

A coffee maker comprising a lower receptacle having a body portion, a closed bottom and an open upper end, a single upper receptacle having a reduced lower end adapted to be telescoped into the lower receptacle, said upper receptacle having a closed bottom and being provided with a single circumferential series of perforations in its peripheral wall adjacent to but spaced slightly above said closed bottom, the peripheral wall of said upper receptacle presenting except for said perforations an otherwise continuous and unbroken structure, said closed bottom being dished upwardly slightly inwardly of said peripheral wall to insure the presence of coffee in the region of the perforations when the device is in use and also to provide a trap between the upwardly dished portion of the bottom and said peripheral wall into which said sediment or fine powder washed out of the coffee grains settles and is confined, said trap being unobstructed.

LOUIS JOHN HOIS.